United States Patent [19]

Nakao et al.

[11] Patent Number: 4,716,734
[45] Date of Patent: Jan. 5, 1988

[54] INTERNAL COMBUSTION ENGINE EQUIPPED WITH A SUPERCHARGER AND AN IDLING SPEED CONTROL SYSTEM

[75] Inventors: Masami Nakao, Hiroshima; Masato Iwaki, Higashihiroshima; Hiroshi Kinoshita; Ikuo Okamoto, both of Hiroshima, all of Japan

[73] Assignee: Mazda Motor Corporation, Aki, Japan

[21] Appl. No.: 868,600

[22] Filed: May 30, 1986

[30] Foreign Application Priority Data

Jun. 1, 1985 [JP] Japan ............... 60-83303[U]

[51] Int. Cl.⁴ .............................. F02B 33/44
[52] U.S. Cl. ...................... 60/599; 60/611; 180/68.4
[58] Field of Search ........... 60/600, 601, 611, 599; 123/563, 564; 180/68.4

[56] References Cited

U.S. PATENT DOCUMENTS

| | | | |
|---|---|---|---|
| 2,022,094 | 11/1935 | Shoemaker et al. | 123/564 X |
| 2,366,365 | 1/1945 | Sorensen | 60/599 |
| 4,385,496 | 5/1983 | Yamane | 123/563 X |
| 4,473,055 | 9/1984 | Ito et al. | 60/611 X |
| 4,489,688 | 12/1984 | Ito et al. | 60/611 X |
| 4,572,139 | 2/1986 | Ishigami | 123/564 X |

FOREIGN PATENT DOCUMENTS 178843 10/1983 Japan .................. 60/611

Primary Examiner—Michael Koczo
Attorney, Agent, or Firm—Gerald J. Ferguson, Jr.; Michael P. Hoffman; Michael J. Foycik, Jr.

[57] ABSTRACT

An internal combustion engine equipped with a supercharger and an idling speed control system comprises a combustion chamber provided with an exhaust passage and an inlet passage in which the supercharger is provided, a throttle valve provided at a downstream portion of the inlet passage compared with the supercharger, an intercooler provided at the downstream portion of the inlet passage compared with the supercharger, a bypass passage provided to the inlet passage for detouring the throttle valve with one end thereof connected with a portion of the inlet passage between the supercharger and the intercooler and the other end thereof connected with another portion of the inlet passage downstream from the intercooler, and an air flow control valve for adjusting intake air mass flow supplied through the bypass passage to the combustion chamber on the occasion of a start of the engine and/or during an idle operation of the engine.

12 Claims, 6 Drawing Figures

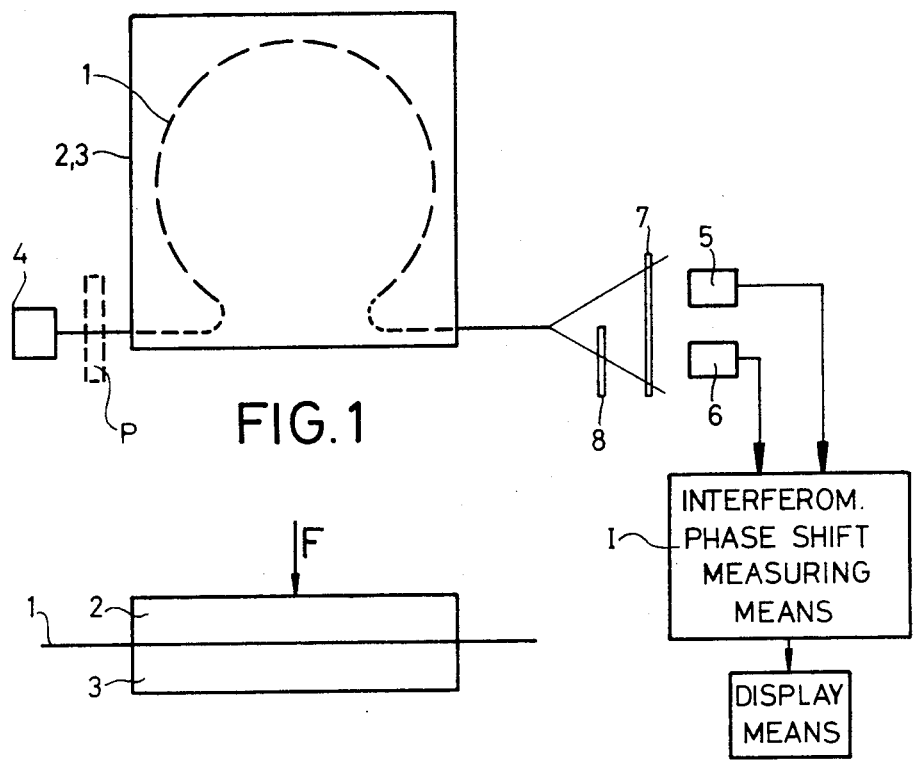
FIG. 1
FIG. 2
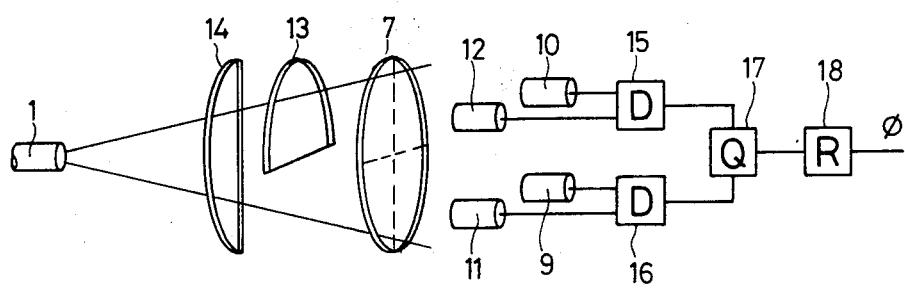
FIG. 3

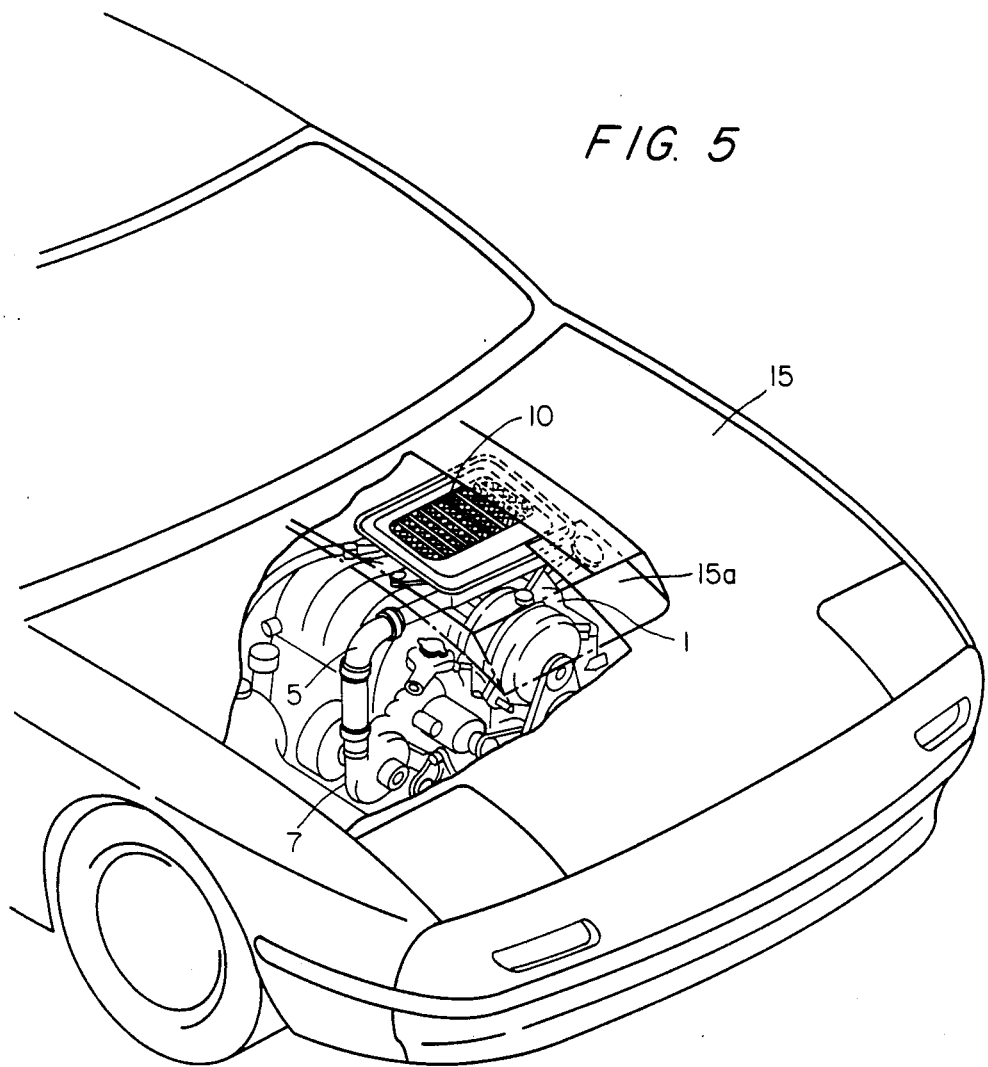

INTERNAL COMBUSTION ENGINE EQUIPPED WITH A SUPERCHARGER AND AN IDLING SPEED CONTROL SYSTEM

BACKGROUND OF THE INVENTION

1. Field of the Invention

The present invention relates generally to an internal combustion engine equipped with a supercharger and an idling speed control system, and more particularly, to an internal combustion engine which is equipped with a supercharger in an inlet channel in which an intercooler and a throttle valve are also disposed at the downstream portion thereof compared with the supercharger and with an idling speed control system containing a bypass channel connected with the inlet channel to detour the throttle valve.

2. Description of the Prior Art

There has been proposed an internal combustion engine used for an automobile which is provided with an idling speed control system for controlling idling speed of the engine in response to operating conditions of the same for the purpose of restricting the idling speed as low as possible without causing engine stop under a condition wherein the engine operates with appendant loads, such as an air conditioner, so as to improve fuel consumption and advancing warming-up of the engine after a cold start of the same. In the idling speed control system, a bypass channel with an air flow control valve installed therein is provided for detouring a throttle valve installed in an inlet channel of the engine and the air flow control valve is controlled in its opening degree to adjust intake air mass flow supplied to the engine during an idle operation of the engine, so that the idling speed is maintained to be a target idling speed set in response to actual operating conditions of the engine.

It has been also proposed to apply such an idling speed control system as mentioned above to an internal combustion engine equipped with a supercharger which is operative to augment output power of the engine, as disclosed in, for example, the Japanese patent application published before examination with the publication No. 58-178843. In a previously proposed internal combustion engine which is equipped with a supercharger together with an intercooler which is provided at the downstream portion of an inlet channel compared with the supercharger for cooling intake air compressed by the supercharger in the inlet channel and to which the idling speed control system is applied, a bypass channel for detouring a throttle valve installed in the inlet channel is formed to have one end thereof connected to a portion of the inlet channel immediately downstream from the throttle valve and the other end thereof connected to another portion of the inlet channel immediately downstream from throttle valve, without consideration of a positional relation with the intercooler. For example, in the case of such an engine that has an intercooler provided at the upstream portion of an inlet channel compared with a throttle valve, a bypass channel for detouring the throttle valve is formed with one end thereof connected to a portion of the inlet channel downstream from the intercooler and the other end thereof connected to another portion of the inlet channel downstream from the throttle valve.

In such a previously proposed arrangement, since intake air flows into the bypass channel after passing through the intercooler wherein the intake air is cooled and therefor fuel mixed with the intake air is impeded to evaporate appropriately on the occasion of a cold start of the engine and during an idle operation of the engine after the cold start, the cold start of the engine is apt to be prevented from being carried out smoothly and idling speed of the engine is likely to be unstable or changeable. Further, especially, in the case of such an arrangment that the intercooler is positioned over the engine, the intercooler is heated up to be of relatively high temperature with heat radiated from the engine for a while after the engine is stopped operating, and consequently, if the engine is started to operate again immediately after it is stopped operating once, that is, the engine is subjected to a hot start, intake air flows into the bypass channel after passing through the intercooler wherein the intake air is heated and therefore air charge efficiency is reduced, so that the hot start of the engine is apt to be prevented from being carried out smoothly and idling speed of the engine is likely to be unstable or changeable after the hot start of the engine.

OBJECTS AND SUMMARY OF THE INVENTION

Accordingly, it is an object of the present invention to provide an internal combustion engine equipped with a supercharger and an idling speed control system which avoids the aforementioned problems encountered with the prior art.

Another object of the present invention is to provide an internal combustion engine equipped with a supercharger and an idling speed control system, which is provided with a bypass channel arranged in an improved manner to be connected with an inlet channel having a throttle valve therein for adjusting idling speed of the engine.

A further object of the present invention is to provide an internal combustion engine equipped with a supercharger and an idling speed control system, in which an inlet channel is provided with a throttle valve and an intercooler therein and a bypass channel for adjusting idling speed of the engine is arranged in an improved manner to be connected with the inlet channel, so that a start of the engine is smoothly carried out and the stability of idling speed of the engine is raised.

A still further object of the present invention is to provide an internal combustion engine equipped with a supercharger and an idling speed control system, in which an inlet channel is provided with a throttle valve and an intercooler therein and a bypass channel for adjusting idling speed of the engine is arranged in an improved manner to be connected with the inlet channel, so that intake air is prevented from being cooled or heated by the intercooler on the occasion of a start of the engine and/or during an idle operation of the engine, and therefore fuel mixed with the intake air evaporates appropriately on the occasion of a cold start of the engine and/or air charge efficiency is prevented from being reduced during the idle operation of the engine after a hot start of the engine.

In accordance with the present invention, there is provided an internal combustion engine equipped with a supercharger and an idling speed control system, which comprises a combustion chamber from which an exhaust channel is elongated, an inlet channel for guiding intake air to the combustion chamber, in which the supercharger is provided for compressing the intake air therein, a throttle valve provided at a downstream portion of the inlet channel compared with the supercharger for controlling intake air mass flow supplied to the combustion chamber, an intercooler provided at the downstream portion of the inlet channel compared with the supercharger for cooling the intake air compressed by the supercharger, a bypass channel provided for detouring the throttle valve with one end thereof connected to a portion of the inlet channel between the supercharger and the intercooler and the other end thereof connected to another portion of the inlet channel downstream from the intercooler, and an air flow control valve for adjusting intake air mass flow supplied through the bypass channel to the combustion chamber on the occasion of a start of the engine and/or during an idle operation of the engine.

In the engine thus constituted in accordance with the present invention, since the bypass channel is arranged to detour the intercooler provided in the inlet channel in addition to the throttle valve, the intake air guided through the bypass channel to the combustion chamber does not pass through the intercooler on the occasion of the start of the engine and/or during the idle operation of the engine, and therefore the intake air supplied to the combustion chamber on the occasion of a cold start of the engine and/or during the idle operation of the engine is not cooled undesirably by the intercooler. Further, in the case where the intercooler is positioned over the engine and therefore heated up to be of relatively high temperature with heat radiated from the engine for a while after the engine is stopped operating, the intake air supplied to the combustion chamber on the occasion of a hot start of the engine is not heated undesirably by the intercooler.

Accordingly, with the engine according to the present invention, fuel mixed with the intake air supplied to the combustion chamber on the occasion of the cold start of the engine and during the idle operation of the engine is appropriately evaporated and therefore the cold start of the engine is carried out smoothly and/or idling speed of the engine is kept stable after the cold start of the engine. Besides, air charge efficiency is not reduced when the engine is caused to operate with the hot start thereof and therefore the hot start of the engine is also carried out smoothly and/or the idling speed of the engine is kept stable after the hot start of the engine.

The above, and other objects, features and advantages of the present invention will become apparent from the following detailed description which is to be read in conjunction with the accompanying drawings.

BRIEF DESCRIPTION OF THE DRAWINGS

FIG. 5 is an enlarged view showing the intercooler in the engine compartment according to the present invention.

DESCRIPTION OF THE PREFERRED EMBODIMENTS

Figure 1:
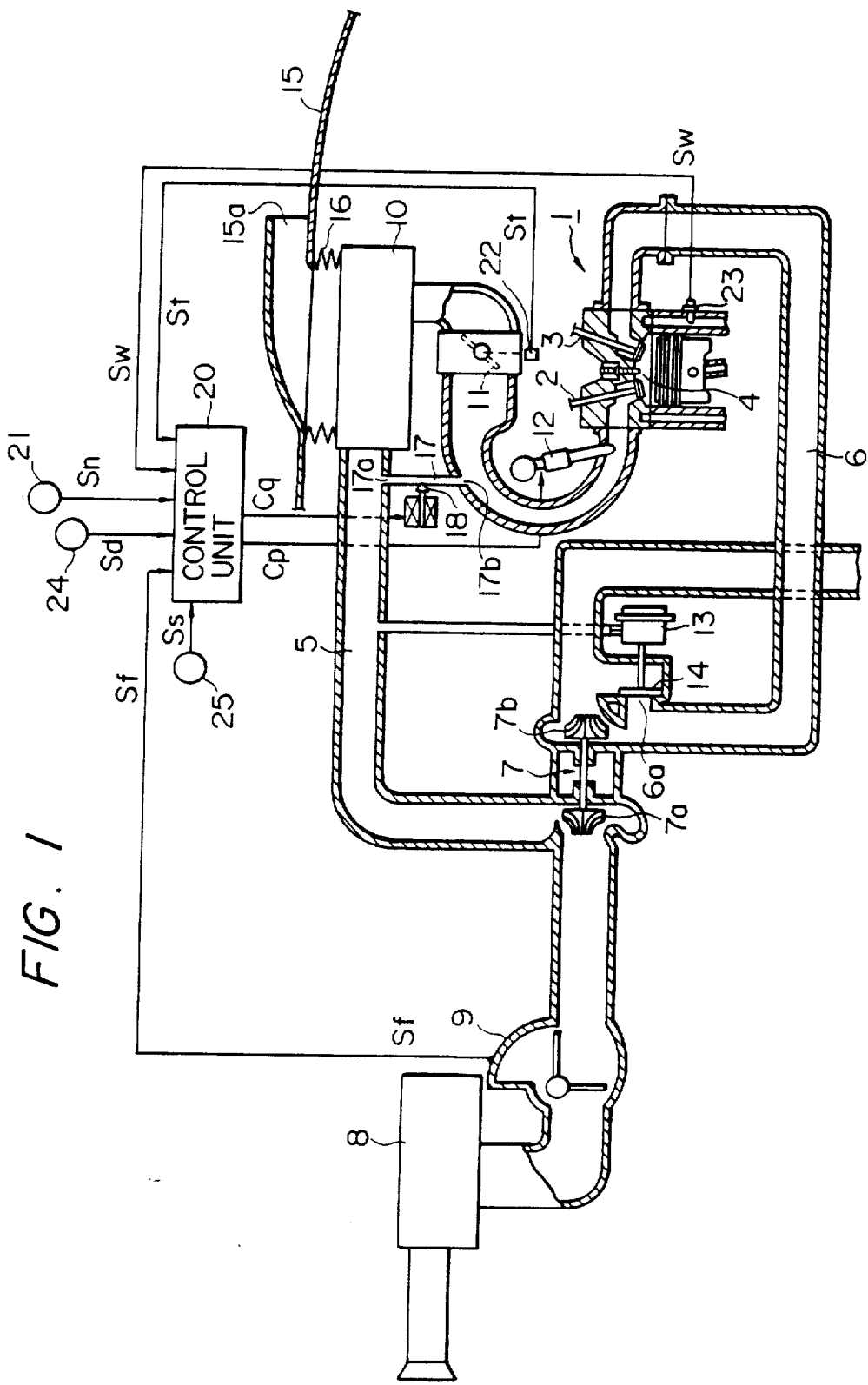
FIG. 1 is a schematic illustration showing one embodiment of internal combustion engine equipped with a supercharger and an idling speed control system according to the present invention.

An embodiment of internal combustion engine equipped with a supercharger and an idling speed control system according to the present invention is schematically shown in FIG. 1 of the drawings.

Referring to FIG. 1, an engine body 1 is provided with a combustion chamber 4 formed therein, and an inlet channel 5 connected through an intake valve 2 to the combustion chamber 4 and an exhaust channel 6 elongated through an exhaust valve 3 from the combustion chamber 4 are provided to the engine body 1. In connection with both the inlet channel 5 and the exhaust channel 6, a turbosupercharger 7 is provided. In the inlet channel 5, an air cleaner 8, air flow meter 9, compressor 7a of the turbosupercharger 7, intercooler 10, throttle valve 11 and fuel injector 12 are disposed from the upstream portion to the downstream portion thereof.

The turbosupercharger 7 has a turbine 7b disposed in the exhaust channel 6 in addition to the compressor 7a. The turbine 7b is directly connected to the compressor 7a and is driven by exhaust gas which is discharged from the combustion chamber 4 through the exhaust valve 3 into the exhaust channel 6, so as to rotate the compressor 7a. The compressor 7a thus rotated is operative to compress intake air introduced through the air cleaner 8 into the inlet channel 5 and supplies the intake air compressed thereby to the intercooler 10 disposed at a portion of the inlet channel 5 downstream portion the turbosupercharger 7.

To the exhaust channel 6, an exhaust bypass channel 6a is attached for coupling the entrance of the turbine 7b with the exit of the turbine 7b through a waste gate valve 14 which is provided in the exhaust bypass channel 6a and driven to open and close the same by a diaphragm type actuator 13. The waste gate valve 14 is operative to open the exhaust bypass channel 6a so as to cause the exhaust gas from the combustion chamber 4 to detour the turbine 7b when the compressed pressure in the inlet channel 5 reaches a predetermined pressure value, so that the exhaust gas applied to the turbine 7b is controlled appropriately.

The intercooler 10 is operative to cool the intake air compressed by the turbosupercharger 7 and supply the same through the throttle valve 11 and the intake valve 2 to the combustion chamber 4. In this embodiment, this intercooler 10 is positioned over the engine body 1 and formed into such an air cooled intercooler as to be cooled by air flow introduced through an air intake 15a provided on a hood 15 and an air guide 16 connected to the air intake 15a from the outside.

Then, a bypass channel 17 for adjusting idling speed is provided to the inlet channel 5 to detour the throttle valve 11 disposed in the inlet channel 5. One end of the bypass channel 17 is connected to a portion of the inlet channel 5 between the compressor 7a of the turbosupercharger 7 and the intercooler 10 and the other end of the bypass channel 17 is connected to another portion of the inlet channel 5 downstream from the throttle valve 11. In other words, the intercooler 10 and the throttle valve 11 provided at a location downstream from the intercooler 10 are disposed at an area of the inlet channel 5 between an upper end 17a and a lower end 17b of the bypass channel 17.

To the bypass channel 17, an air flow control valve 18 is provided for adjusting an intake air mass flow supplied through the bypass channel 17 and the intake valve 2 to the combustion chamber 4. This air flow control valve 18 is controlled in its opening state by a control unit 20.

The control unit 20 is supplied with a detection output signal Sf obtained from the air flow sensor 9 to represent intake air mass flow introduced through the air cleaner 8 into the inlet channel 5, a detection output signal Sn obtained from an engine speed sensor 21 to represent an actual engine speed, a detection output signal St obtained from a throttle opening degree sensor 22 to represent opening degree of the throttle valve 11, and a detection output signal Sw obtained from a coolant temperature sensor 23 to represent coolant temperature in the engine body 1. Further, in addition, a detection output signal Sd obtained from a load sensor 24 which detects a condition in which an appendant load such as an air conditioner is driven by the engine, and a detection output signal Ss obtained from a starter sensor 25 which detects a condition in which a starter switch is in the ON state are also supplied to the control unit 20.

The control unit 20 is operative to calculate a reasonable quantity of fuel to inject into the inlet channel 5 on the strength of both the detection output signals Sf and Sn supplied from the air flow meter 9 and engine speed sensor 21, respectively, and then to form an injection control signal Cp representing the reasonable quantity of fuel and supply the same to the fuel injector 12. The fuel injector 12 to which the injection control signal Cp is supplied is controlled to carry out intermittently the fuel injection with the reasonable quantity of fuel in the inlet channel 5 in response to the injection control signal Cp.

Further, the control unit 20 is operative also to perform a feedback idling speed control for causing the actual engine speed, which is detected by the engine speed sensor 21, to coincide with a target engine speed, which is determined in response to operating conditions of the engine, on the occasion of a start of the engine and during an idle operation of the engine. In such a feedback idling speed control, the operating condition of the engine on the occasion of the start of the engine and during the idle operation of the engine is detected on the strength of the detection output signals Sf, Sn, St, Sw, Sd and Ss, and then a control pulse signal Cq which has its pulse duration corresponding to the detected operating condition of the engine is supplied to the air flow control valve 18 provided to the bypass channel 17. The air flow control valve 18 which is supplied with the control pulse signal Cq is controlled to open the bypass channel 17 in response to the pulse duration of the control pulse signal Cq.

The control unit 20 provided in the embodiment shown in FIG. 1 may be composed of a microcomputer. One example of an operation program of such a microcomputer for performing the feedback idling speed control is carried out in accordance with a flow chart shown in FIG. 2.

Figure 2:
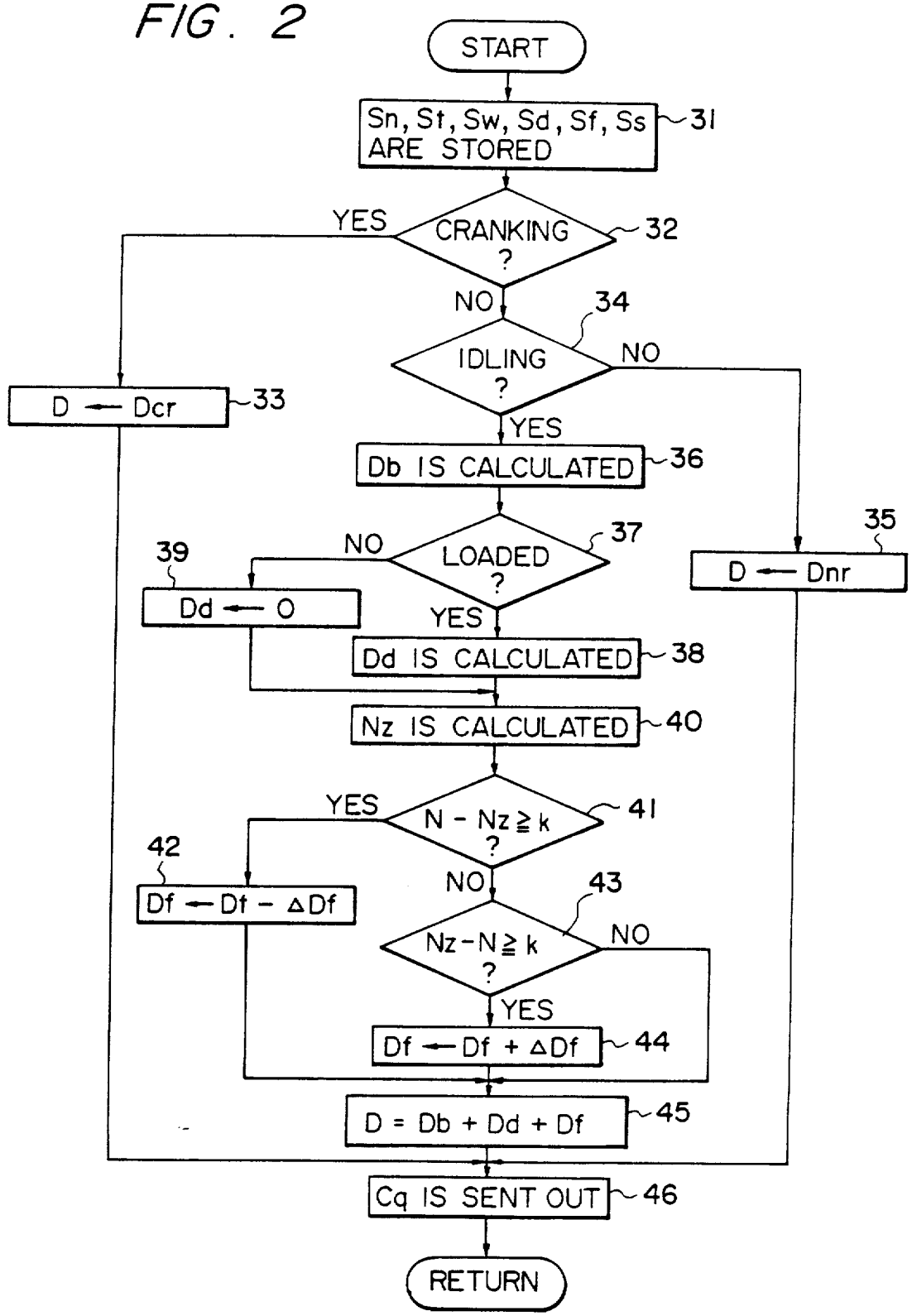
FIG. 2 is a flow chart used for explaining the operation of a control unit used in the embodiment shown in FIG. 1.
Figure 4:
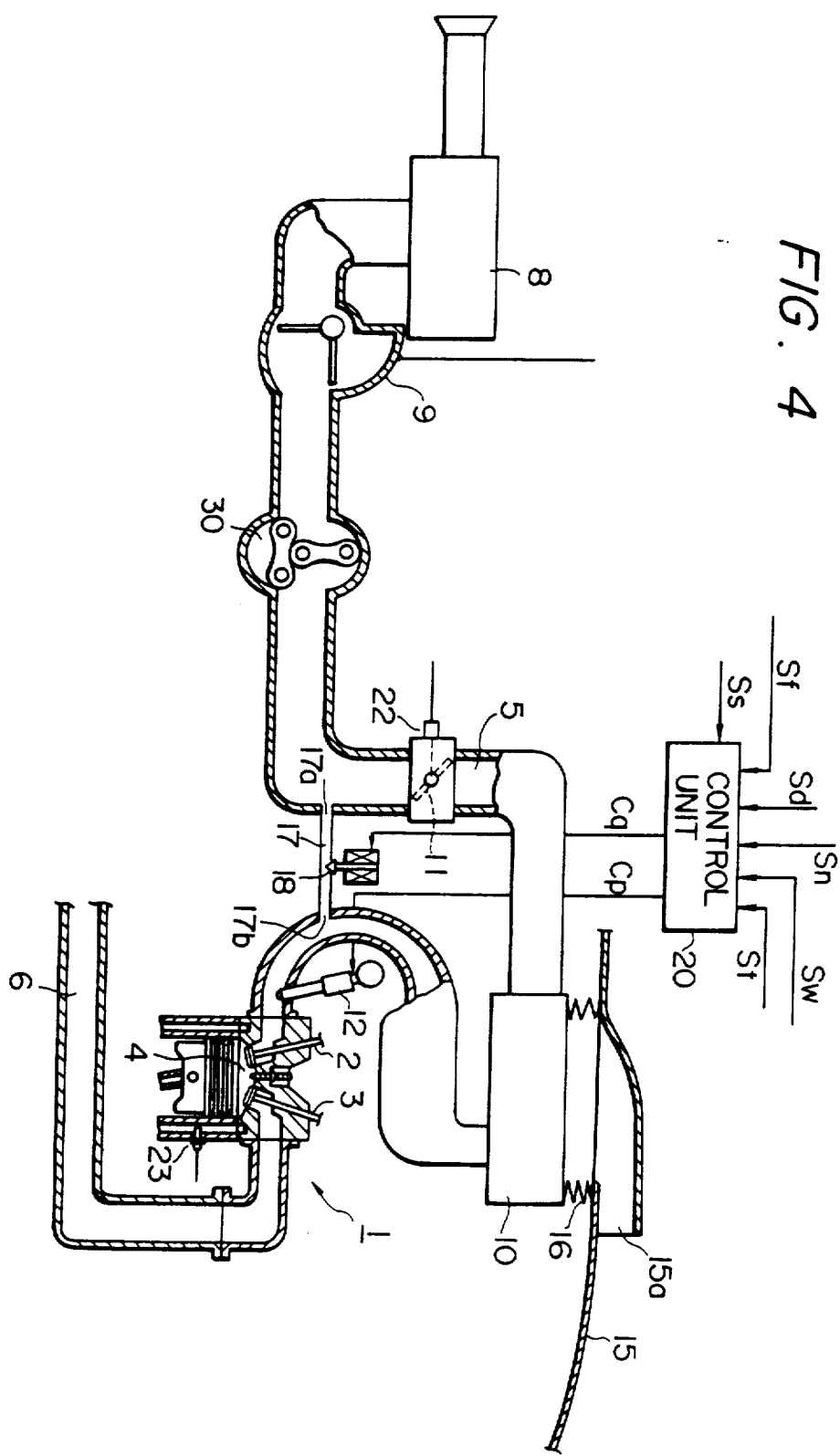

According to the flow chart shown in FIG. 2, first, in a process 31, the detection output signals Sf, Sn, St, Sw, Sd and Ss are stored. Then, in a decision 32, it is checked whether the engine is in a cranking condition or not. When the engine is in the cranking condition, a control duration D is set to be a predetermined starting duration Dcr in a process 33, and the step is advanced to a process 46. In the process 46, the control pulse signal Cq having the pulse duration corresponding to the predetermined starting duration Dcr is sent out to the air flow control valve 18, and then the step returns to the process 31.

Figure 3A:
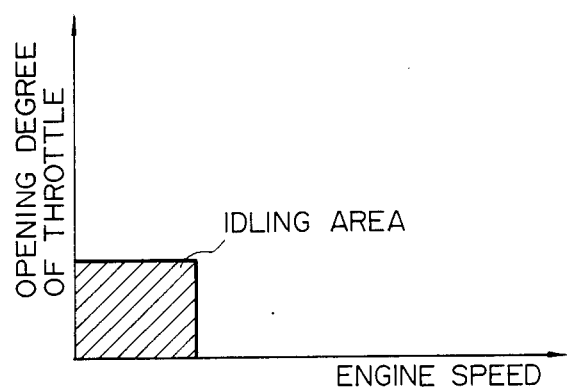
FIGS. 3A and 3B are characteristic chart used for explaining the operation of a control unit used in the embodiment shown in FIG. 1.

To the contrary, when the engine is not in the cranking condition, it is checked whether the engine is in the idle operation or not in a decision 34. In this check, the idle operation may be defined with reference to an idling area indicated with hatchings on a characteristic chart shown in FIG. 3A. If the engine is not in the idle operation, the control duration D is set to be a fixed duration Dnr in a process 35, and the step is advanced to the process 46. In the process 46, the control pulse signal Cq having the pulse duration corresponding to the fixed duration Dnr is sent out to the air flow control valve 18, and then the step returns to the process 31.

Figure 3B:
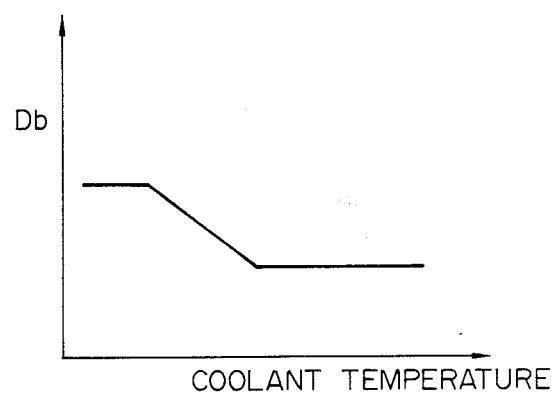

When it is clarified that the engine is in the idle operation in the decision 34, a fundamental duration Db is calculated in accordance with the operating condition of the engine represented by the detection output signals Sf, St, Sw, Sd and so on in a process 36. The fundamental duration Db may be obtained to vary in response to variations in the coolant temperature represented by the detection output signal Sw in such a manner as shown in FIG. 3B. After that, in a decision 37, it is checked whether the engine is operating with the appendant load, for example, the air conditioner driven thereby or not. As a result of this check, if it is clarified that the engine is operating with the appendant load driven thereby, a first supplemental duration Dd is calculated on the strength of the detection output signal Sd in a process 38, and then the step is advanced to a process 40. To the contrary, if the engine is operating without any appendant load, the first supplemental duration Dd is set to be zero in a process 39, and then the step is advanced to a process 40.

In the process 40, the target engine speed Nz is calculated in accordance with the operating condition of the engine represented by the detection output signals Sf, St, Sw, Sd and so on, and in a decision 41, it is checked that the actual engine speed N represented by the detection output signal Sn is greater by k (k is a positive value) or more than the target engine speed Nz or not. When the actual engine speed N is greater by k or more than the target engine speed Nz, a second supplemental duration Df is reduced by a predetermined unit duration $\Delta$Df in a process 42, and then the step is advanced to a process 45. On the other hand, when the actual engine speed N is not greater by k or more than the target engine speed Nz, it is checked that the target engine speed Nz is greater by k or more than the actual engine speed Nz or not in a decision 43. As a result of the check in the decision 43, if the target engine speed Nz is not greater by k or more than the actual engine speed Nz, the step is directly advanced to the process 45, and if the target engine speed Nz is greater by k or more than the actual engine speed N, the second supplemental duration Df is increased by the predetermined unit duration $\Delta$Df in a process 44, and then the step is advanced to the process 45.

In the process 45, the control duration D is calculated by summing up the fundamental duration Db, first supplemental duration Dd and second supplemental duration Df. After that, in the process 46, the control pulse signal Cq having the pulse duration corresponding to the control duration D obtained in the process 45 is sent out to the air flow control valve 18, and then the step returns to the process 31.

In the embodiment thus constituted, on the occasion of starting its operation and during the idle operation with the throttle valve 11 almost fully closed in the inlet channel 5, the intake air introduced through the air cleaner 8 into the inlet channel 5 is supplied through the bypass channel 17 to the combustion chamber 4 and the intake air mass flow in the bypass channel 17 is adjusted by the air flow control valve 18 which is operative to open the bypass channel 17 in response to the pulse duration of the control pulse signal Cq supplied from the control unit 20, so that the intake air mass flow supplied to the combustion chamber 4 is kept constant at the start of operation and the idling speed after the start of operation is controlled to coincide with the target engine speed which is set in response to the actual operating condition of the engine.

Under such a control for the air flow control valve 18 provided to the bypass channel 17, the intake air introduced into the inlet channel 5 is supplied through the bypass channel 17 to the combustion chamber 4 without passing through the intercooler 10 on the occasion of the start of operation and during the idle operation. Accordingly, on the occasion of the start of operation and during the idle operation, the intake air is not cooled by the intercooler 10 and consequently fuel injected by the fuel injector 12 to be mixed with the intake air evaporates appropriately, so that a cold start is smoothly carried out and the stability of the idling speed is raised. Further, when the engine is started to operate again immediately after it is stopped operating once, that is, the engine is subjected to a hot start, since the intake air supplied through the bypass channel 17 to the combustion chamber 4 is not heated by the intercooler 10 which is heated with heat from the engine body 1, air charge efficiency is not reduced, so that the hot start is smoothly carried out and the idling speed after the hot start is kept stable.

Figure 4:
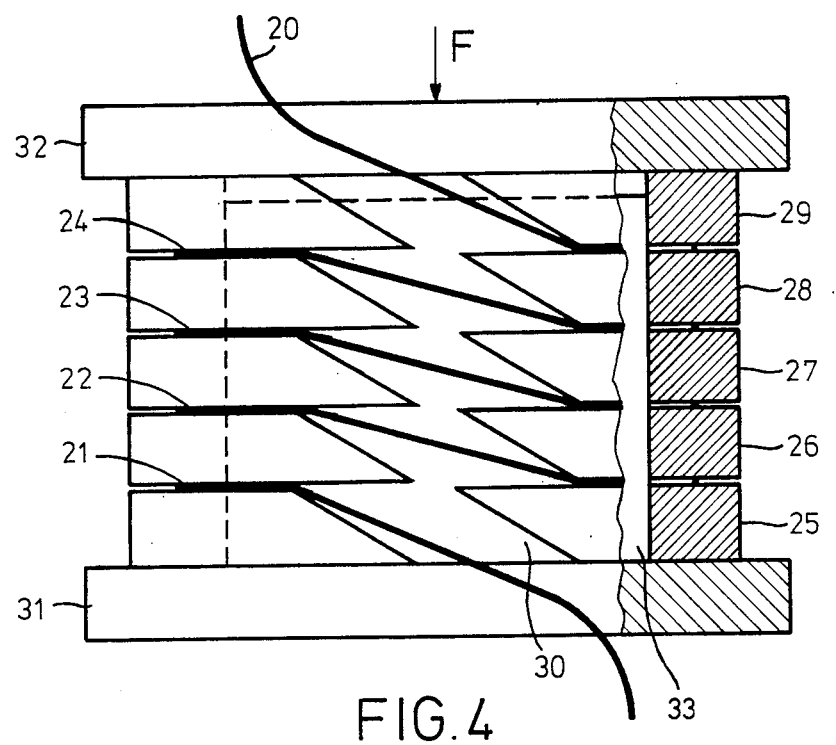
FIG. 4 is a schematic illustration showing another embodiment of internal combustion engine equipped with a supercharger and an idling speed control system according to the present invention.

FIG. 4 shows another example of an internal combustion engine equipped with a supercharger and a idling speed control system according to the present invention. In FIG. 4, elements, parts, portions and signals corresponding to those of FIG. 1 are marked with the same references and further description thereof will be omitted.

In the example shown in FIG. 4, an intercooler 10 is disposed at a portion of an inlet channel 5 downstream from a throttle valve 11, and an engine-driven supercharger 30 is provided, in place of the turbosupercharger 7 used in the example of FIG. 1, at a portion of an inlet channel 5 upstream from the portion of the throttle valve 11. Then, a bypass channel 17 is provided to the inlet channel 5 for detouring the throttle valve 11 with an upper end 17a thereof connected to a portion of the inlet channel 5 between the engine-driven supercharger 30 and the throttle valve 11 and a lower end 17b thereof connected to another portion of the inlet channel 5 downstream from the intercooler 10. This bypass channel 17 is also accompanied with an air flow control valve 18 which is controlled in its opening state by a control unit 20.

Other portions are constituted in the same manner as the example shown in FIG. 1.

With this example also, intake air introduced through an air cleaner 8 into the inlet channel 5 is supplied through the engine-driven supercharger 30 and the bypass channel 17 to a combustion chamber 4 without passing through the intercooler 10 on the occasion of starting its operation and during its idle operation, similarly to the case of the example shown in FIG. 1. Accordingly, effects and advantages similar to those of the example of FIG. 1 are obtained.

FIG. 5 is an enlarged view showing the position of intercooler 10 within the engine compartment. As can be seen, intercooler 10 is positioned over the engine body 1.

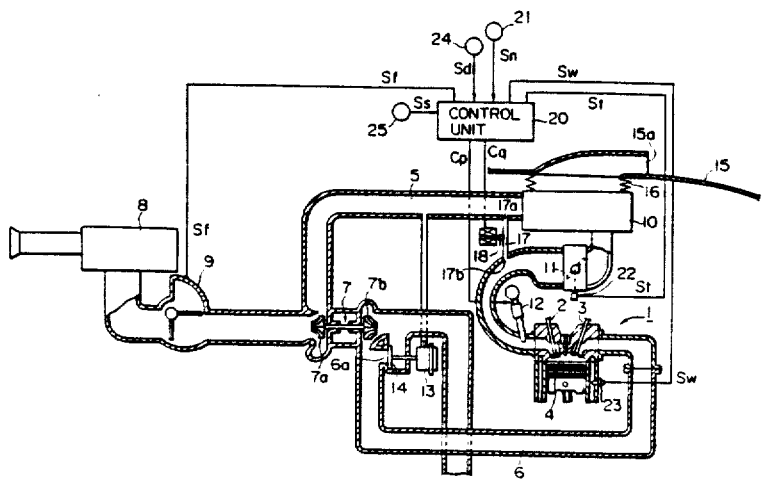

What is claimed is:

1. An internal combustion engine equipped with a supercharger and an idling speed control system comprising,
   a combustion chamber formed in an engine body and provided with an exhaust passage elongating therefrom,
   an inlet passage for guiding intake air to said combustion chamber, said inlet passage being provided with the supercharger for compressing the intake air therein,
   a throttle valve provided at a downstream portion of said inlet passage compared with said supercharger for controlling intake air mass flow supplied to said combustion chamber,
   an intercooler provided at the downstream portion of said inlet passage compared with said supercharger for cooling the intake air compressed by said supercharger,
   a bypass passage provided to said inlet passage for detouring said throttle valve, said bypass passage having one end thereof connected with a portion of said inlet passage between said supercharger and said intercooler and the other end thereof connected with another portion of said inlet passage downstream from said intercooler, and
   an air flow control valve for adjusting intake air mass flow supplied through said bypass passage to said combustion chamber
   start detecting means for detecting a start of the engine by detecting a cranking condition of the engine, and
   valve control means for controlling said air flow control valve to supply a predetermined air mass flow to the combustion chamber when the start of the engine is detected by said start detecting means.

2. An internal combustion engine according to claim 1, wherein said intercooler is positioned over said engine body.

3. An internal combustion engine according to claim 2, wherein said intercooler is disposed under an air intake provided on a hood for covering said engine body.

4. An internal combustion engine according to claim 1, wherein said throttle valve is disposed at a portion of said inlet passage downstream from said intercooler.

5. An internal combustion engine according to claim 4, wherein said supercharger is a turbosupercharger driven by exhaust gas flowing in said exhaust passage.

6. An internal combustion engine according to claim 4, wherein said supercharger is an engine-driven supercharger.

7. An internal combustion engine according to claim 1, wherein said intercooler is disposed at a portion of said inlet passage downstream from said throttle valve.

8. An internal combustion engine according to claim 7, wherein said supercharger is a turbosupercharger driven by exhaust gas flowing in said exhaust passage.

9. An internal combustion engine according to claim 7, wherein said supercharger is an engine-driven supercharger.

10. An internal combustion engine according to claim 1 further comprising feedback control means for putting said air flow control valve in a feedback control for adjusting said air mass flow supplied through said bypass passage to the combustion chamber so as to cause an actual engine speed to coincide with a target engine speed determined in response to an operating condition of the engine when the engine is in an idling operation.

11. An internal combustion engine according to claim 10, wherein said intercooler is positioned over said engine body.

12. An internal combustion engine equipped with a supercharger and an idling speed control system comprising, a combustion chamber formed in an engine body and provided with an exhaust passage elongating therefrom, an inlet passage for guiding intake air to said combustion chamber, said inlet passage being provided with the supercharger for compressing the intake air therein, a throttle valve provided at a downstream portion of said inlet passage compared with said supercharger for controlling intake air mass flow supplied to said combustion chamber, an intercooler provided at the downstream portion of said inlet passage compared with said supercharger for cooling the intake air compressed by said supercharger, a bypass passage provided to said inlet passage for detouring said throttle valve, said bypass passage having one end thereof connected with a portion of said inlet passage between said supercharger and said intercooler and the other end thereof connected with another portion of said inlet passage more downstream than said intercooler, an air flow control valve operative to be controlled in its opening state by a control pulse signal for adjusting intake air mass flow supplied through said bypass passage to said combustion chamber, start detecting means for detecting a start of the engine by detecting a cranking condition of the engine, idling detecting means for detecting an idling operation of the engine, speed sensor for detecting speed of the engine, and valve control means for supplying a first control pulse signal provided with a predetermined pulse duration to said air flow control valve to control the latter to suppply a predetermined air mass flow to the combustion chamber when the start of the engine is detected by said start detecting means, and supplying a second control pulse signal provided with a pulse duration determined in response to a difference between an actual speed of the engine detected by said speed sensor and a target speed of the engine when the idling operation of the engine is detected by said idling detecting means.

* * * * *

UNITED STATES PATENT AND TRADEMARK OFFICE
CERTIFICATE OF CORRECTION

PATENT NO. : 4,716,734

DATED : January 5, 1988

INVENTOR(S) : Masami Nakao et al.

It is certified that error appears in the above-identified patent and that said Letters Patent is hereby corrected as shown below:

The Title Page should be deleted to appear as per attached Title Page. The sheets of drawings containing Figures 1, 2, 3 and 4 should be deleted to be replaced with Figures 1, 2 and 4 as shown on the attached sheets.

Signed and Sealed this

Twelfth Day of July, 1988

Attest:

DONALD J. QUIGG

Attesting Officer

Commissioner of Patents and Trademarks

United States Patent [19]

Nakao et al.

[11] Patent Number: 4,716,734
[45] Date of Patent: Jan. 5, 1988

[54] INTERNAL COMBUSTION ENGINE EQUIPPED WITH A SUPERCHARGER AND AN IDLING SPEED CONTROL SYSTEM

[75] Inventors: Masami Nakao, Hiroshima; Masato Iwaki, Higashihiroshima; Hiroshi Kinoshita; Ikuo Okamoto, both of Hiroshima, all of Japan

[73] Assignee: Mazda Motor Corporation, Aki, Japan

[21] Appl. No.: 868,600

[22] Filed: May 30, 1986

[30] Foreign Application Priority Data

Jun. 1, 1985 [JP] Japan ............... 60-83303[U]

[51] Int. Cl.⁴ .................................... F02B 33/44
[52] U.S. Cl. ............................ 60/599; 60/611; 180/68.4
[58] Field of Search ............ 60/600, 601, 611, 599; 123/563, 564; 180/68.4

[56] References Cited

U.S. PATENT DOCUMENTS

| | | | |
|---|---|---|---|
| 2,022,094 | 11/1935 | Shoemaker et al. | 123/564 X |
| 2,366,365 | 1/1945 | Sorensen | 60/599 |
| 4,385,496 | 5/1983 | Yamane | 123/563 X |
| 4,473,055 | 9/1984 | Ito et al. | 60/611 X |
| 4,489,688 | 12/1984 | Ito et al. | 60/611 X |
| 4,572,139 | 2/1986 | Ishigami | 123/564 X |

FOREIGN PATENT DOCUMENTS 178843 10/1983 Japan ......................... 60/611

Primary Examiner—Michael Koczo
Attorney, Agent, or Firm—Gerald J. Ferguson, Jr.; Michael P. Hoffman; Michael J. Foycik, Jr.

[57] ABSTRACT

An internal combustion engine equipped with a supercharger and an idling speed control system comprises a combustion chamber provided with an exhaust passage and an inlet passage in which the supercharger is provided, a throttle valve provided at a downstream portion of the inlet passage compared with the supercharger, an intercooler provided at the downstream portion of the inlet passage compared with the supercharger, a bypass passage provided to the inlet passage for detouring the throttle valve with one end thereof connected with a portion of the inlet passage between the supercharger and the intercooler and the other end thereof connected with another portion of the inlet passage downstream from the intercooler, and an air flow control valve for adjusting intake air mass flow supplied through the bypass passage to the combustion chamber on the occasion of a start of the engine and/or during an idle operation of the engine.

12 Claims, 6 Drawing Figures